(12) United States Patent
Chieu et al.

(10) Patent No.: US 9,450,985 B2
(45) Date of Patent: Sep. 20, 2016

(54) SERVER VALIDATION WITH DYNAMIC ASSEMBLY OF SCRIPTS

(71) Applicant: International Business Machines Corporation, Armonk, NY (US)

(72) Inventors: Trieu C. Chieu, Scarsdale, NY (US); Robert Filepp, Westport, CT (US); Brian L. Peterson, Ridgefield, CT (US); Ratnasagar M. Ramaratnam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/450,422

(22) Filed: Aug. 4, 2014

(65) Prior Publication Data

US 2016/0036858 A1  Feb. 4, 2016

(51) Int. Cl.
  *G06F 9/445* (2006.01)
  *H04L 29/06* (2006.01)
  *H04L 29/08* (2006.01)

(52) U.S. Cl.
  CPC ............ *H04L 63/20* (2013.01); *H04L 67/10* (2013.01); *G06F 8/60* (2013.01)

(58) Field of Classification Search
  CPC .............. G06F 8/60; G06F 8/63; G06F 8/70; G06F 8/73; H04L 63/20
  USPC .................................................. 717/168–178
  See application file for complete search history.

(56) References Cited

U.S. PATENT DOCUMENTS

| | | | |
|---|---|---|---|
| 5,751,941 A * | 5/1998 | Hinds et al. ............... | 714/38.14 |
| 7,076,534 B1 | 7/2006 | Cleron et al. | |
| 2003/0182656 A1* | 9/2003 | Leathers et al. ............. | 717/177 |
| 2005/0066015 A1 | 3/2005 | Dandekar et al. | |
| 2005/0172284 A1* | 8/2005 | Dandekar et al. ............ | 717/175 |
| 2006/0026463 A1* | 2/2006 | Paliwal et al. .................. | 714/37 |
| 2007/0022407 A1* | 1/2007 | Givoni et al. ................ | 717/124 |
| 2008/0184200 A1* | 7/2008 | Burns ................. | G06F 9/44505 717/121 |
| 2009/0070771 A1* | 3/2009 | Yuyitung ............... | G06Q 10/06 718/105 |
| 2011/0202901 A1* | 8/2011 | Givoni et al. ................ | 717/125 |
| 2012/0265726 A1* | 10/2012 | Padmanabhan ....... | G06F 17/303 707/602 |
| 2012/0284690 A1* | 11/2012 | Blakeley et al. ............. | 717/120 |
| 2013/0247136 A1* | 9/2013 | Chieu et al. ....................... | 726/1 |
| 2014/0053072 A1* | 2/2014 | Guo ........................ | G06F 9/468 715/736 |
| 2015/0052402 A1* | 2/2015 | Gurumurthy et al. ....... | 714/38.1 |

FOREIGN PATENT DOCUMENTS

WO  WO2013056643  4/2013

OTHER PUBLICATIONS

Gai et al., "Cloud Testing—Issues, Challenges, Needs and Practice," Software Engineering: An International Journal (SEIJ), vol. 1, No. 1, Sep. 2011, pp. 9-23.*
Grundy et al., "Deployed software component testing using dynamic validation agents," The Journal of Systems and Software 74, 2005, pp. 5-14.*
Wikipedia, "Cloud Computing," http://en.wikipedia.org/wiki/Cloud_computing, Jul. 2014, 17 pages.
Wikipedia, "Grid Computing," http://en.wikipedia.org/wiki/Grid_computing, Jul. 2014, 13 pages.

* cited by examiner

*Primary Examiner* — Wei Zhen
*Assistant Examiner* — Andrew M Lyons
(74) *Attorney, Agent, or Firm* — Louis J. Percello; Ryan, Mason & Lewis, LLP

(57) ABSTRACT

Systems and methods for computer automated validation of server configurations are provided. A method for validation of a target environment, comprises assembling a validation script from a plurality of script fragments, inserting the assembled validation script into the target environment, executing the validation script in the target environment, gathering results of the executing, and reporting the results to at least one user.

16 Claims, 9 Drawing Sheets

100

300

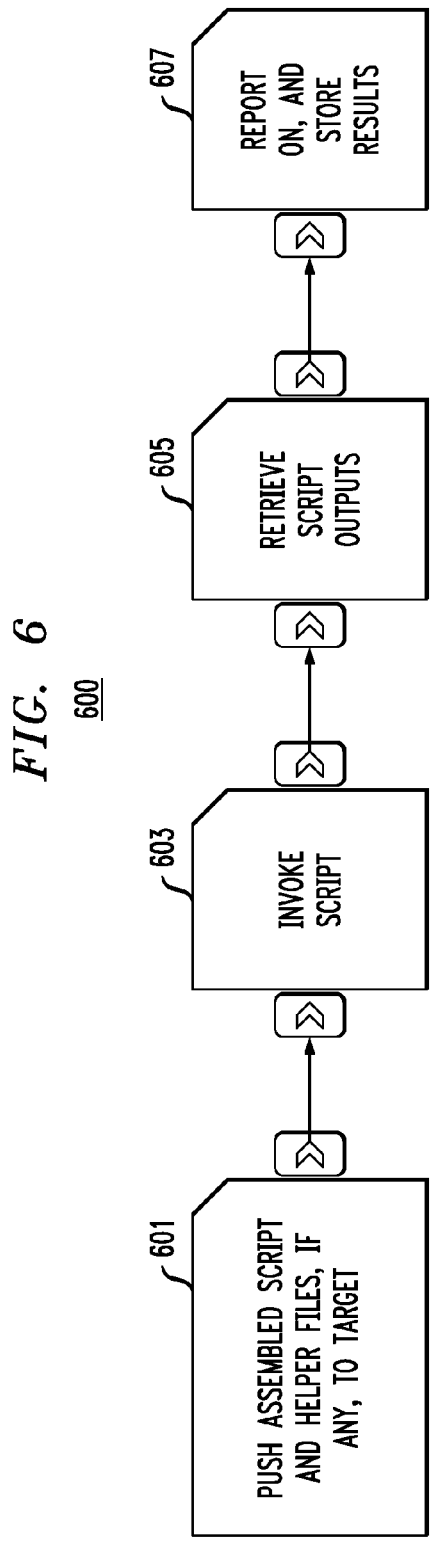

FIG. 7
700

```
#© Copyright IBM® Corporation 2011. All rights reserved.

Linux_q2_3()
{
shc_1line_question_html "$Linux_q2_3_lit_01"
if [ -f /etc/login.defs ]
then
      shc_1line_output_description_html "$Linux_q2_3_lit_02"
      shc_compliant_status_html
      complcount='expr $complcount + 1' min_age='grep ^PASS_MIN_DAYS /etc/login.defs'
      set -- $min_age
      min_age=$2
      if [ $min_age -eq $Linux_q2_3_lit_03 ]
        then
              shc_1line_output_description_html "$Linux_q2_3_lit_04"
              shc_compliant_status_html
              complcount='expr $complcount + 1'
        else
              echo "$Linux_q2_3_lit_05" >> /tmp/Non-Compliant-List.$$
              shc_1line_output_description_html "$Linux_q2_3_lit_05"
              shc_non_compliant_status_html
              noncomplcount='expr $noncomplcount + 1'
        fi
              rm -f /tmp/q2_3.$$
      done
else
      echo "$Linux_q2_3_lit_07" >> /tmp/Non-Compliant-List.$$
      shc_1line_output_description_html "$Linux_q2_3_lit_07"
      shc_non_compliant_status_html
      noncomplcount='expr $noncomplcount + 1'
fi
}
```

FIG. 8
800

| Q 1.1 Userid | *Executed on pool07* |
| --- | --- |
| UNIQUE UIDs | COMPLIANT |
| Q 2.1 Authentication Script | *Executed on pool07* |
| PASSWORDS SET AT 90 DAYS. | COMPLIANT |
| USER: ROOT PASSWORD EXPIRATION NOT SET AT 90 | COMPLIANT – GLOBAL EXCEPTION FOR CLOUD |
| Q 2.3 Minimum Password Age | *Executed on pool07* |
| /etc/login.defs FILE EXISTS | COMPLIANT |
| PASSWORD MINIMUM AGE SET AT 1 DAY. | COMPLIANT |
| Q 2.4 Parameter of pam_unix.so | *Executed on pool07* |
| Q 3.1 Check for /etc/motd – BUN | *Executed on pool07* |
| /etc/motd or /etc/issue IS PRESENT | COMPLIANT |
| Q 3.2 Checking for HOME directories for all users and Global umask | *Executed on pool07* |
| USER: ROOT HOME DIRECTORY /root WITH CORRECT PERMISSION | COMPLIANT |
| USER: TEST HOME DIRECTORY /home/test WITH CORRECT PERMISSION | COMPLIANT |
| GLOBAL UMASK SETTING IN /etc/bashrc IS CORRECT | COMPLIANT |
| Q 4. Information protection and confidentiality – password | *Executed on pool07* |
| FILE DOES NOT EXIST | NON-COMPLIANT |
| Q 5.1 File/Directory Permissions | *Executed on pool07* |
| PERMISSIONS SET PROPERLY ON / | COMPLIANT |
| PERMISSIONS SET PROPERLY ON /usr | COMPLIANT |
| PERMISSIONS SET PROPERLY ON /etc | COMPLIANT |

SERVER VALIDATION WITH DYNAMIC ASSEMBLY OF SCRIPTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The field generally relates to systems and methods for managing computing utilities and, in particular, systems and methods for computer automated validation of server configurations.

BACKGROUND

Recently, there appears to have been a shift from the de-centralization of information processing to increased platform centralization and platform management, as well as a renewed interest in computing as a utility. These trends are illustrated by efforts to centrally manage grid computing facilities, in what appears to be a rising popularity of virtualization products, and an emphasis on cloud computing. Each of these technologies attempt to execute a migration of workloads to platforms where the workloads may be the most efficiently managed and the most effectively executed. The rationale behind these technologies is generally one of cost savings.

SUMMARY

In general, exemplary embodiments of the invention include systems and methods managing computing utilities and, in particular, systems and methods for computer automated validation of server configurations.

Embodiments of the present invention describe server-side composition of scripts, which will be executed on a client. In accordance with embodiments of the present invention, scripts are assembled for delivery to and execution by a client. The scripts that are assembled are capable of being delivered to, and executed in the client environment, not in the server environment. Accordingly, the assembly engine is cognizant of the operating system and other characteristics of the client device and assembles its scripts appropriately. For example, scripts that are assembled for execution on Windows® clients are written in a language that can be executed on Windows® platforms, while scripts assembled for execution on a UNIX® system are written in a language which can be executed on a UNIX® platform. Further, in accordance with embodiments of the present invention, the script functions that are assembled for delivery are assembled in a specific order.

Embodiments of the present invention provide methods for passing information between script functions once they are assembled, and for dynamically inserting commands to execute the script functions into the script during the assembly process, so that a client can eventually execute a downloaded script.

According to an exemplary embodiment of the present invention, a method for validation of a target environment, comprises assembling a validation script from a plurality of script fragments, inserting the assembled validation script into the target environment, executing the validation script in the target environment, gathering results of the executing, and reporting the results to at least one user.

According to an exemplary embodiment of the present invention, a system for validation of a target environment, comprises a validation module capable of assembling a validation script from a plurality of script fragments, and inserting the assembled validation script into the target environment, a target module capable of executing the validation script in the target environment, wherein the validation module is further capable of gathering results of the executing, and a reporting module capable of reporting the results to at least one user.

According to an exemplary embodiment of the present invention, a computer program product for server validation, comprises a computer readable storage medium having program instructions embodied therewith, the program instructions executable by a processor to cause the processor to perform a method comprising assembling a validation script from a plurality of script fragments, inserting the assembled validation script into a target environment, executing the validation script in the target environment, gathering results of the executing, and reporting the results to at least one user.

These and other embodiments of the invention will become apparent from the following detailed description of illustrative embodiments thereof, which is to be read in connection with the accompanying drawings.

BRIEF DESCRIPTION OF THE DRAWINGS

Exemplary embodiments of the present invention will be described below in more detail, with reference to the accompanying drawings, of which:

FIG. 6 illustrates a process flow performed after script assembly, according to an exemplary embodiment of the present invention.

FIG. 7 is a sample of a script fragment, according to an exemplary embodiment of the present invention.

FIG. 8 is an excerpt from a validation result report, according to an exemplary embodiment of the present invention.

DETAILED DESCRIPTION

Figure 1:
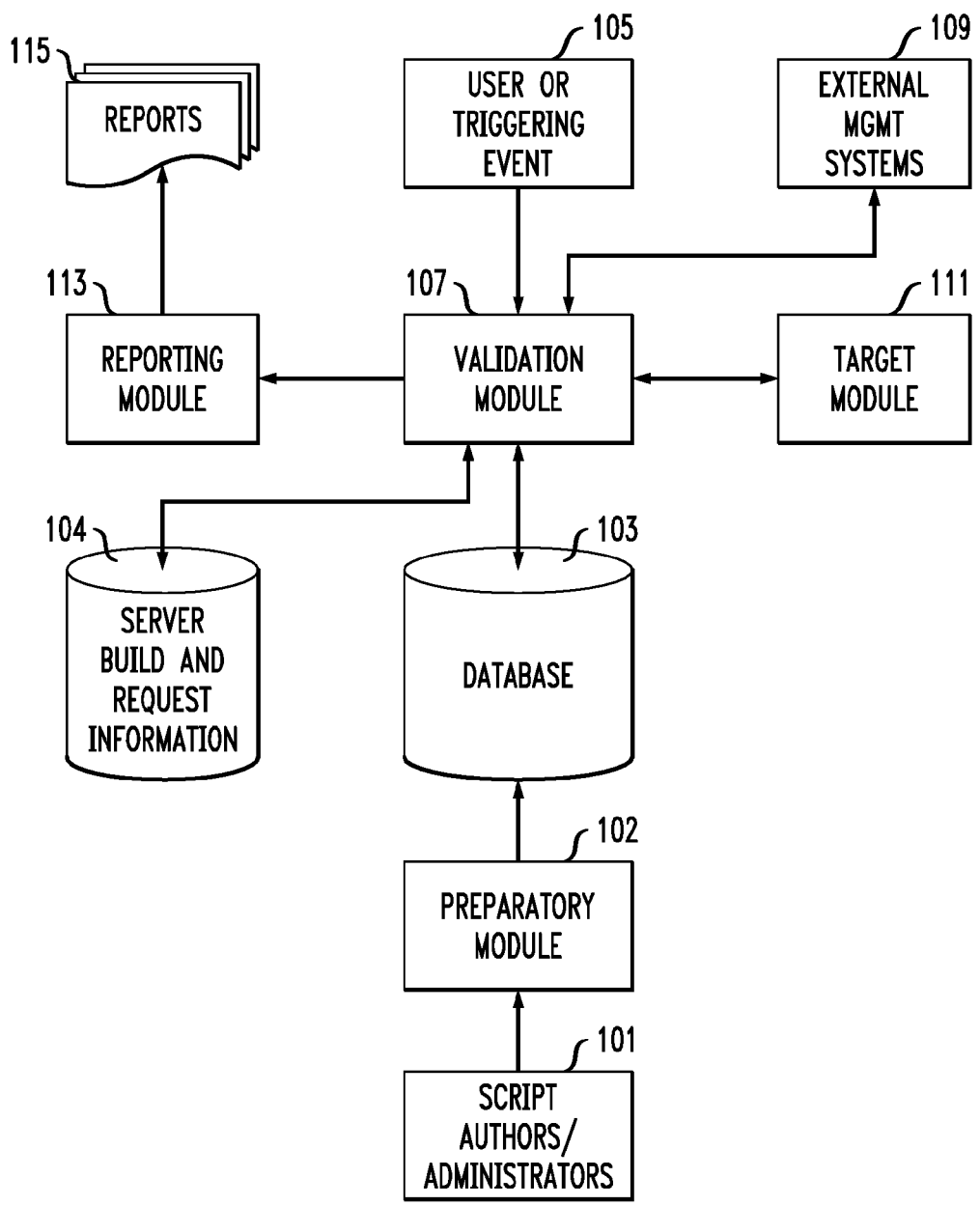
FIG. 1 is a block diagram of an automated server configuration validation system, according to an exemplary embodiment of the present invention.

Exemplary embodiments of the invention will now be discussed in further detail with regard to systems and methods for managing computing utilities and, in particular, to systems and methods for computer automated validation of server configurations. This invention may, however, be embodied in many different forms and should not be construed as limited to the embodiments set forth herein.

Time Sharing Service Bureaus provided a form of what is referred to as a Platform As A Service (PAAS), providing an infrastructure whose cost could be shared across customers such that the cost to each customer might be less than the cost of independent ownership.

Grid computing utilizes computer resources from a plurality of administrative domains to reach a common goal, and attempts to reduce cost by increasing efficiency. Grid computing takes advantage of available computing resources, which are not being used, and incorporates the unused resources into a network in which workloads could be appropriately placed as computing resources become available.

Virtualization is an enabling technology designed to assist in the migration of a workload to a more centralized, more efficiently managed platform. Cloud computing delivers computing as a service, providing shared resources, software, and information to computers and other devices over a network. Cloud computing, therefore, is another vehicle providing an infrastructure whose cost can be shared across customers, so that the cost to each customer may be less than the cost of independent ownership.

In order to realize the potential benefits offered by increased platform centralization and centralized platform management, existing workloads must be migrated into those environments including the more efficiently managed platforms. The migration process involves various steps, including, but not necessarily limited to: (a) thoroughly understanding an existing source environment; (b) evaluating target platforms with regard to their ability to sustain workloads; (c) customizing the target systems, as needed, to accept workloads; (d) performing a validation process of a target platform configuration to ensure that security risks are mitigated and that the platform is configured to meet requirements; (e) providing a mechanism to move a workload to a target platform; and (f) performing a further validation to ensure that a workload functions properly in its new environment.

The step (d) of validating a target platform configuration may be complex and very time consuming since, for example, requirements may vary from customer to customer and workload to workload, and may change over time. In addition, the step (d) may rely on systems administrators to run a variety of operating system commands and other systems management tools, capturing screenshots of outputs, making declarations that necessary tasks been performed and attesting to their results. These results may be subject to review by auditing agencies in order to assure compliance with contractual agreements. In some instances, the step (d) can take days or weeks to complete, and the results may ultimately be inaccurate. Therefore, in order to improve the timeliness and accuracy with which computing utility services may be realized, embodiments of the present invention provide methods and systems for automating target server configuration validation.

In accordance with an embodiment of the present invention, a system dynamically invokes external agencies to supply any required data that is unavailable to a local system, and merges this data into a validation script. The required data includes, but is not necessarily limited to, registration of the target server with inventory management systems, with security scanning systems, results of security scans, frequency of security scans, and registration of user accounts with account maintenance systems. The validation script is dynamically assembled from a library of re-usable script fragments appropriate to the characteristics of target servers, and which are also appropriate to stated requirements of the customer at hand. Additionally, the system inserts the assembled script(s) into the target server, executes the scripts, gathers the results, stores information about the validation attempt in a repository, generates reports, and notifies a list of users and management systems as to the validation attempt results.

Configuration policies refer to policies that describe an agreement between customers and service providers as to the specifics of server configurations. Validation of a target platform configuration, in accordance with an embodiment of the present invention, ensures that a provisioned server meets specific and contractually agreed upon configuration policies. Policies may vary within a customer account, per geography, per department, or per any other criteria that has been agreed upon by the customer and service provider. For example, a customer might require passwords to be 8 characters long for servers in a first geographical region, and 10 characters long for servers in a second geographical region. Such policies might be effectively expressed as scripts, which incorporate parameterization to avoid unnecessary duplication of scripts.

In some cases, the steps which must be taken to validate configuration parameters will vary between platforms. For example, a relatively simple example of a subset of the validation tasks might include validating a minimum user account password length enforced by a system. To perform this validation on, for example, a Linux® operating system, a systems administrator may need to issue the command "grep^PASS_MIN_LEN/etc/login.defs", print the results to an output file or capture the terminal display results, and include those outputs and results in a document showing evidence of compliance validation. For Windows® 2008 systems, the minimum password length enforcement may be validated by executing a "net accounts" command, parsing the output to find the value prefaced by "Minimum password length:", and capturing and reporting the results. For AIX® systems, a minimum password length enforcement may be validated by executing the command "lsuser" per user, finding the "minlen" stanza, and capturing and reporting the results. Each of these three operating systems has a unique way of obtaining the minimum password length enforced on the server. Embodiments of the present invention are configured to handle steps for validating configuration parameters that vary between platforms.

In other cases, the steps which must be taken to validate configuration parameters, may be shared between all platforms. For example verifying the registration of a target server with other management systems may require invocation of a secondary process, which interrogates an external database as to the registration status of the target server, retrieves the results, and reports the results, all of which steps can be indifferent to the target server platform specifics. Embodiments of the present invention are configured to handle steps for validating configuration parameters that are shared between platforms.

In some cases, identical steps, which must be taken to validate configuration parameters, may be shared between a subset of generally similar, but not identical, platforms. For example, Linux® and AIX® are both variants of the UNIX® operation system. Linux® and AIX® may share a common step to validate whether they permit empty passwords by issuing a generic Unix® command 'grep"^PermitEmptyPasswords"/etc/ssh/sshd_config|awk'{print $NF}'", retrieving, parsing, and reporting the results. There is no need to duplicate this step between Linux®, AIX®, and other UNIX® systems, and it may be re-used. Embodiments of the present invention are configured to recognize where steps for validating configuration parameters can be re-used.

Embodiments of the present invention are configured to address several dimensions of complexity. For example, validation steps may be invoked in a certain sequence that reflects a variety of customer policies, and may be affected by variations between platforms. Some validation steps might potentially be common across all platforms, but may need to be tailored to accommodate varying customer policies. Some validation steps might be common within general platform families, or may be specific to platforms, but common across customer implementations. Because there are affinities and compatibilities between families of platforms and other software, embodiments of the present invention recognize that the mechanics of validation steps can often be shared across varying platforms and other software.

Validation policies may vary along many axes including, but not limited to, customers, geographies, operating systems, and installed middleware. In order to improve the timeliness and accuracy with which computing utility services may be realized, embodiments of the present invention provide methods and systems to more fully automate server configuration validation, which increases flexibility, encourages the use of parameterization, and which facilitates the sharing and re-use of validation steps.

According to embodiments of the present invention, an automated server configuration validation system and method are described, including an administrative procedure, a preparatory procedure, and a steady-state operational procedure. The administrative procedure includes steps such as defining customer account information, specifying desired report layouts and media, and defining report recipients. The preparatory procedure includes a phase in which a library of script fragments is created, and in which external and internal data variables are declared. The preparatory procedure also includes another phase in which customer requirements are codified as a set of questions, which are to be answered by a selection of script fragments to be executed in a specified relative order, and in which data variables are associated with the selected script fragments. This phase may also include associating data variables with external functions, which may populate the data variables.

In accordance with embodiments of the present invention, during the operational procedure, when the system is invoked, it is given a reference to a target environment to be validated. The target environment includes, for example, a target server and any other platform configured to run a workload. The system obtains any required variable information related to the target environment (e.g., target server) from external sources and stores that information as declared in the preparatory phase. The variable information includes, but is not necessarily limited to, registration of the target server with inventory management systems, with security scanning systems, results of security scans, frequency of security scans, and registration of user accounts with account maintenance systems. The system then dynamically assembles validation scripts from a library of re-usable script fragments as appropriate to the characteristics of the target environment (e.g., target server), and as appropriate to the stated policies of the customer concerned, as codified in the preparatory procedure. As part of the script assembly, the system prepares and includes script variable definitions based on any required variable data stored in the prior step. This provides a means to pass information from external sources to the assembled script. The system then inserts the assembled script(s) into the target server, executes the script(s), gathers the results, stores information about the validation attempt in a repository, generates reports, and notifies a list of users and management systems as to the validation attempt results.

In accordance with an embodiment of the present invention, an understanding of the general configuration of a target server can be assumed and may be input as additional criteria for the selection and assembly of appropriate script fragments. The understanding of the general configuration of the target server may be obtained from any of a variety of well-known configuration discovery and management techniques. In an embodiment, representations of high-level configurations of target servers are stored in a database. This information may be used at a high level to help drive the conditional assembly of script fragments based on a target server's operating system. At a finer level, this information may be used to help drive the conditional assembly of scripts addressing specific middleware. The dynamic conditional assembly of script fragments may be influenced by additional factors, such as the owning customer, the geographic location of the target server, and local legal requirements.

FIG. 1 illustrates a block diagram of a system for validation of a server configuration, according to an exemplary embodiment of the present invention. The system 100 includes a database 103. In administrative and preparatory phases, a preparatory module 102, based on input from script authors and/or administrators 101, creates and populates the database 103 with, for example, script fragments, rules for assembling the script fragments, references to external processes, variables, questions, checklists, joins (relationships) and customer account policies. A use or triggering event 105 from a requesting entity, such as, for example, a validation request, triggers the validation module 107 (e.g., a validation server) to invoke external processes, if any, from external management systems 109, and to assemble a validation script from script fragments from the database 103. The validation module 107 transfers and inserts the assembled script to a target module 111 (e.g., a target environment/server), and records execution of the script on the target module 111. The validation module gathers the results of the execution on the target module 111, transmits the results to a reporting module 113 (e.g., an email server), which provides result reports 115 to designated users.

The system 100 further includes a repository 104 for information about a validation request, such as, for example, who made the request, when was the request made, who owns the server from which the request originated and what account does the server belong to. A repository 104 also includes specifications for a target server(s), which may be built or provisioned, including, for example, the operating system of the server(s), user accounts, file systems, disks, network addresses, and middleware.

The validation module is further capable of determining that the script fragments correspond to characteristics of the target environment, and of invoking an external source to supply the characteristics of the target environment. The validation module 107 is also capable of declaring a plurality of data variables in the script fragments, and populating the data variables with values obtained from an external source.

The validation module 107 also codifies a plurality of customer requirements as a set of questions, and uses one or more of the script fragments to answer the set of the questions. In accordance with an embodiment of the present invention, the validation module 107 obtains parameters for the validation script and writes variables to a database, queries whether any checklist rules correspond to one or more of the variables, and scopes the variables at least one of globally, to a checklist and to a request. When a checklist rule corresponds to one or more of the variables, the validation module 107 queries whether the checklist rule has been satisfied, and selects a checklist having the satisfied checklist rule.

Communications between components of the system 100 can be performed via a network, such as, for example, a local area network (LAN), wide area network (WAN), cellular network, satellite network or the Internet.

Figure 2:
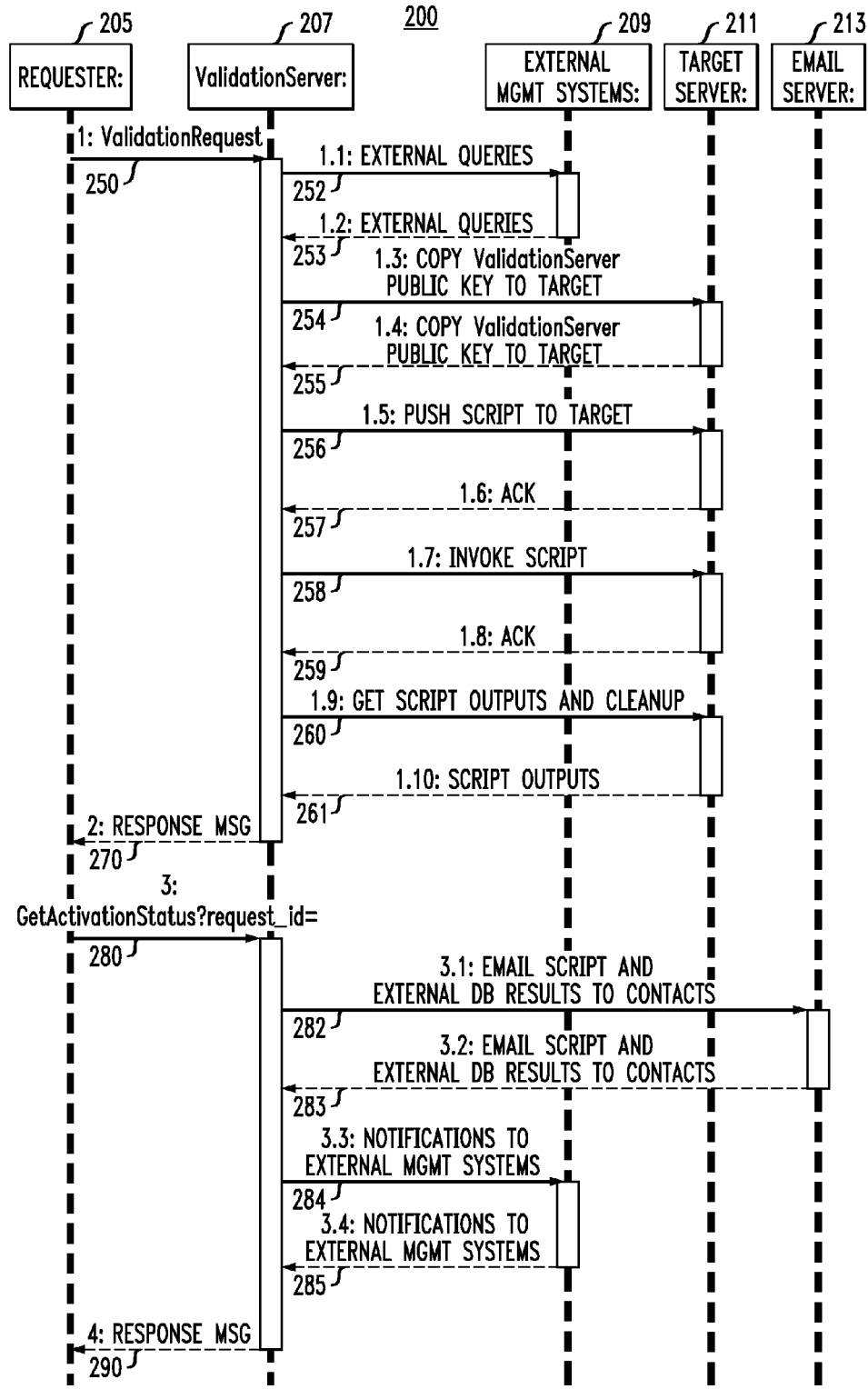
FIG. 2 is a steady state message sequence diagram, according to an exemplary embodiment of the present invention.

FIG. 2 illustrates message flows 200 during an operational phase, according to an exemplary embodiment of the present invention. FIG. 2 includes blocks for a requester 205, validation server 207, external management systems 209, target server 211, and e-mail server 213, which correspond to similarly numbered elements of system 100 in FIG. 1. A validation request 250 is sent from requester 205 to validation server 207. The validation server 207 sends external queries 252 to external management systems 209, which provide a response(s) to the external queries 253 back to the validation server 207. The external queries include, for example, request for information from the external systems to put in scripts, including, but not limited to, script parameters such as, customer account ids, geography and middleware installed on a target.

The validation server 207 sends a request to copy the validation server public key 254 to the target server 211, and receives a response to the request 255 from the target server 211. With this exchange, the validation server 207 is addressing security concerns, such as obtaining the authority to push scripts out to and execute those scripts on the target server 211. The validation server 207 pushes assembled scripts 256 to and invokes scripts 258 on the target server 211, and receives acknowledgement 257, 259 from the target server 211 that a pushed script has been received and a script has been invoked.

The validation server sends a request for script outputs and clean-up of temporary files 260 to the target server 211, and receives, via a file transfer mechanism, script outputs 261 from the target server 211. The validation server 207 sends a response message 270 to the requester 205 regarding the status of the validation request 250 and any script outputs 261.

The requester 205 sends a request for the activation status 280 to the validation server 207, and the validation server 207 sends a request 282 to the e-mail server 213 to email the script and external database results to the contacts. The e-mail server 213 sends a response 283 to the request back to the validation server 207. The response includes an indication that the e-mail to the contacts has been sent, or that there has been a problem with sending the e-mail.

The validation server 207 sends notifications 284 to external management systems 209. The notifications may include, for example, problems with the activation and/or validation. The external management systems 209 respond to the notifications 285, and a response message 290 including, for example, the activation status, is sent from the validation server 207 to the requester 205.

Figure 3:
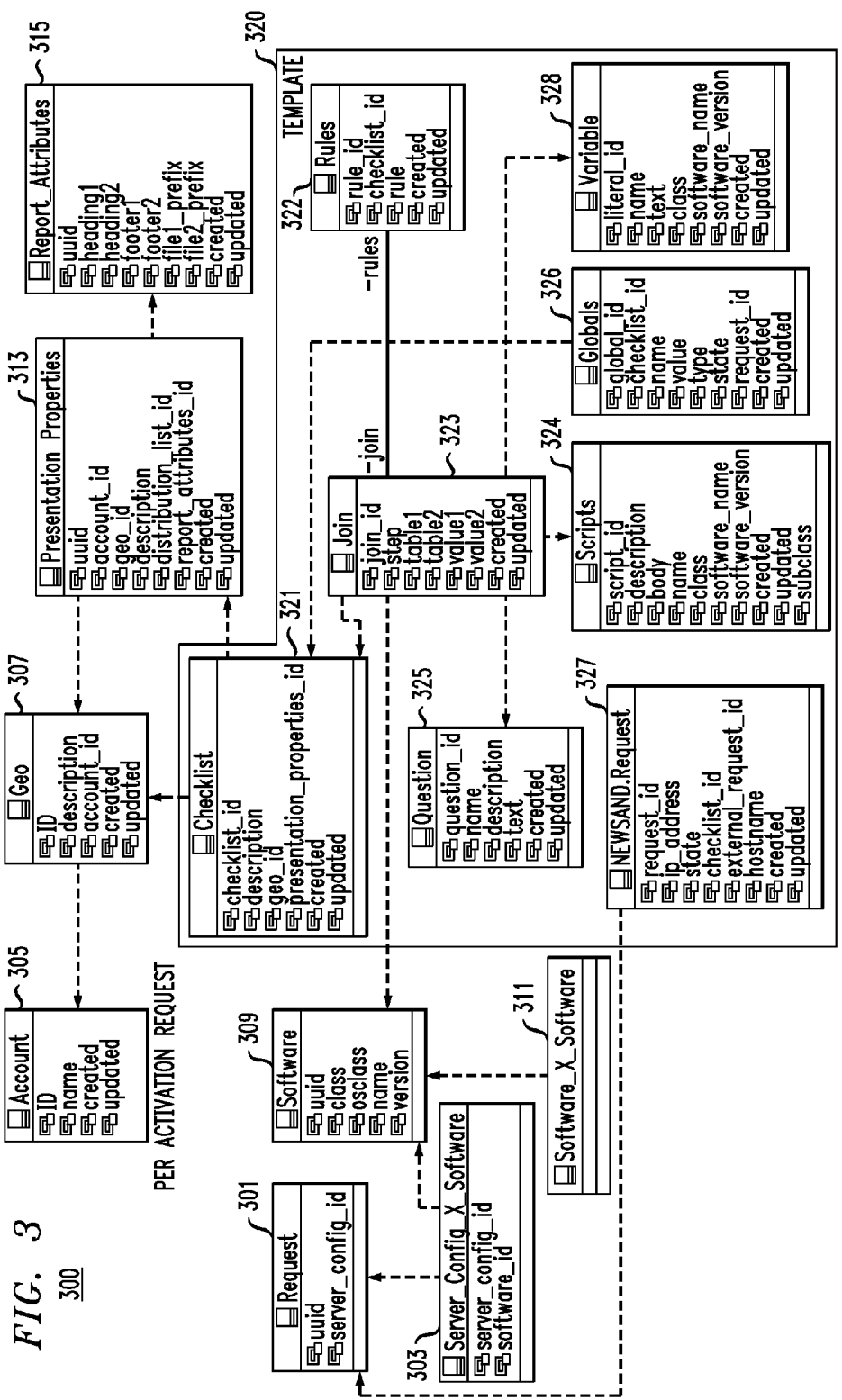
FIG. 3 is an entity relationship schema showing the data entities used in accordance with exemplary embodiments of the present invention.

FIG. 3 illustrates a schema 300 of the database 103, according to an exemplary embodiment of the present invention. The schema 300 includes a location for details of a request 301, which includes storage areas for a universally unique identifier (uuid) and server_config_id, a location for target Server_Config_X_Software 303, which includes storage areas for server_config_id and software_id, a location for Software 309 of a target, which includes storage areas for uuid, class, operating system class (osclass), name and version, and a location for Software_X_Software 311. In brief, the locations 301, 303, 309 and 311 include an operating system and middleware for a target environment. In accordance with an embodiment of the present invention, operating systems and middleware are contained in the same database table (called Software). Software_X_Software is a join table used to express the relationships between various softwares. For example, a software Windows® 2008 and a software Word® 2003 can be permitted to be linked to each other, expressing a relationship: table1=software, value1=Windows 2008, table2=software, value2=Word 2003.

The schema 300 further includes a location for account holder details 305, which includes storage areas for ID, name, created and updated, a location for geographical information 307, which includes storage areas for ID, description, account_id, created and updated, a location for Presentation_Properties 313, which includes storage areas for uuid, account_id, geo_id, description, distribution_list_id, report_attributes_id, created and updated, and a location for Report_Atrributes 315, which includes storage areas for uuid, heading1, heading2, footer1, footer2, file1_prefix, file2_prefix, created and updated. Presentation properties describe what metadata should go into a report, and report attributes describe how to format information in a report back to a user.

The schema further includes a template area 320, which includes a location for checklist data 321, which includes storage areas for checklist_id, description, geo_id, presentation_properties_id, created and updated, a location for join data 323, which includes storage areas for join_id, step, table1, table2, value1, value2, created and updated, a location for question data 325, which includes storage areas for question_id, name, description, text, created, updated, rules, rule_id, checklist_id, rule, created and updated, and a location for scripts data 324, which includes storage areas for script_id, description, body, name, class, software_name, software_version, created, updated and subclass. The template area 320 further includes a location for NEWSAND.Request 327, which includes storage areas for request_id, ip_address, state, checklist_id, external_request_id, hostname, created and updated, a location for Globals 326, which includes storage areas for global_id, checklist_id, name, value, type, state, request_id, created and updated, a location for rules 322, which includes storage areas for rule_id, checklist_id, rule, created and updated, and a location for variables 328, which includes storage areas for literal_id, name, text, class, software_name, software_version, created and updated. NEWSAND.Request refers to a database table that has a row for every validation request that is entered. Globals are variables that are associated with an entire checklist, rather than with a specific question.

With reference to FIG. 3, customer account information, policies, contact information, and reporting preferences are stored in a database. Script fragments are stored in a database and contain, for example, a name, an id, the script fragment content, and information regarding the script fragment's appropriate usage, such as platform types with which it is compatible, and which categories of function it addresses.

References to external functions, which are invoked to retrieve and store data into variables, are stored in the database and used to drive the population of variables as needed. These references include such information as execution path and execution file name. Variables are stored in a database and contain, for example an id, content in string form, an indication as to the content type of the variable, such as "string" or "integer", an indication as to whether the variables are scoped globally, scoped per checklist, or scoped per request instance, or scoped to some other context. The scoping of a variable refers to the contexts to which a variable instance applies. A globally scoped variable maintains a single instance whose value may be referenced from any script fragment. A variable that is scoped to a checklist maintains an instance per checklist, which may be referenced only from within the specified checklist. A variable scoped to a request instance may contain a unique value per request instance.

In a non-limiting illustrative example, a variable, SCAN_FREQ, might be used to pass information regarding security scanning frequency from an external function that manages security, to the script for eventual reporting, by means of variables in the database. In accordance with an embodiment of the present invention, the security scanning frequency variable is updated each time the validation scripts are prepared for a particular target server. For example, if there are three different target servers for which three different requests have been prepared, three instances of the SCAN_FREQ variable are stored into the database.

The script fragment might contain:
outline=outline & "Server found in scan schedule, frequency is:" & SCAN_FREQ which concatenates the declared value of SCAN_FREQ in the script with the string "Server found in scan schedule, frequency is:" and places the result in a script variable named outline. During script assembly, an external service associated with the SCAN_FREQ variable is invoked for the current request, and a value is returned and placed into the variable table of the database. The variables appropriate to the request are then assembled into the script, which is being prepared by the system.

Continuing with the non-limiting illustrative embodiment, a variable table in the database can contain three rows (one for each of three requests that have been initiated):
SCAN_FREQ instance 1, value "annually", scoped to request 1 (server 9.2.3.4);
SCAN_FREQ instance 2, value "biennially", scoped to request 2 (server 9.5.6.7); and
SCAN_FREQ instance 3, value "weekly", scoped to request 3 (server 9.9.8.25).
The assembled script for request 2 can contain:
SCAN_FREQ="biennally"
outline=outline & "Server found in scan schedule, frequency is:" & SCAN_FREQ In accordance with an embodiment of the present invention, if request 2 is re-run at a later time, the external service can report a different value for SCAN_FREQ for request 2 (server 9.5.6.7). Embodiments of the present invention allow reporting the different value, but also maintain the contextual integrity of SCAN_FREQ instances 1 and 3 as well, which is accomplished by scoping the variable to the request/target server.

The assembled script for request 2 can now contain:
SCAN_FREQ="monthly"
outline=outline & "Server found in scan schedule, frequency is:" & SCAN_FREQ According to an embodiment of the present invention, questions are stored in a database and contain an id, a name, and a description. By using a generic join table, customer policies are joined with questions, script fragments, and variables. This can provide more flexibility than explicit use of foreign key relationships within joined tables. By using a generic external join table, a level of indirection is introduced, which provides greater flexibility. For example, tables can be joined dynamically without making schema changes if relationships between tables are added or removed.

Figure 4:
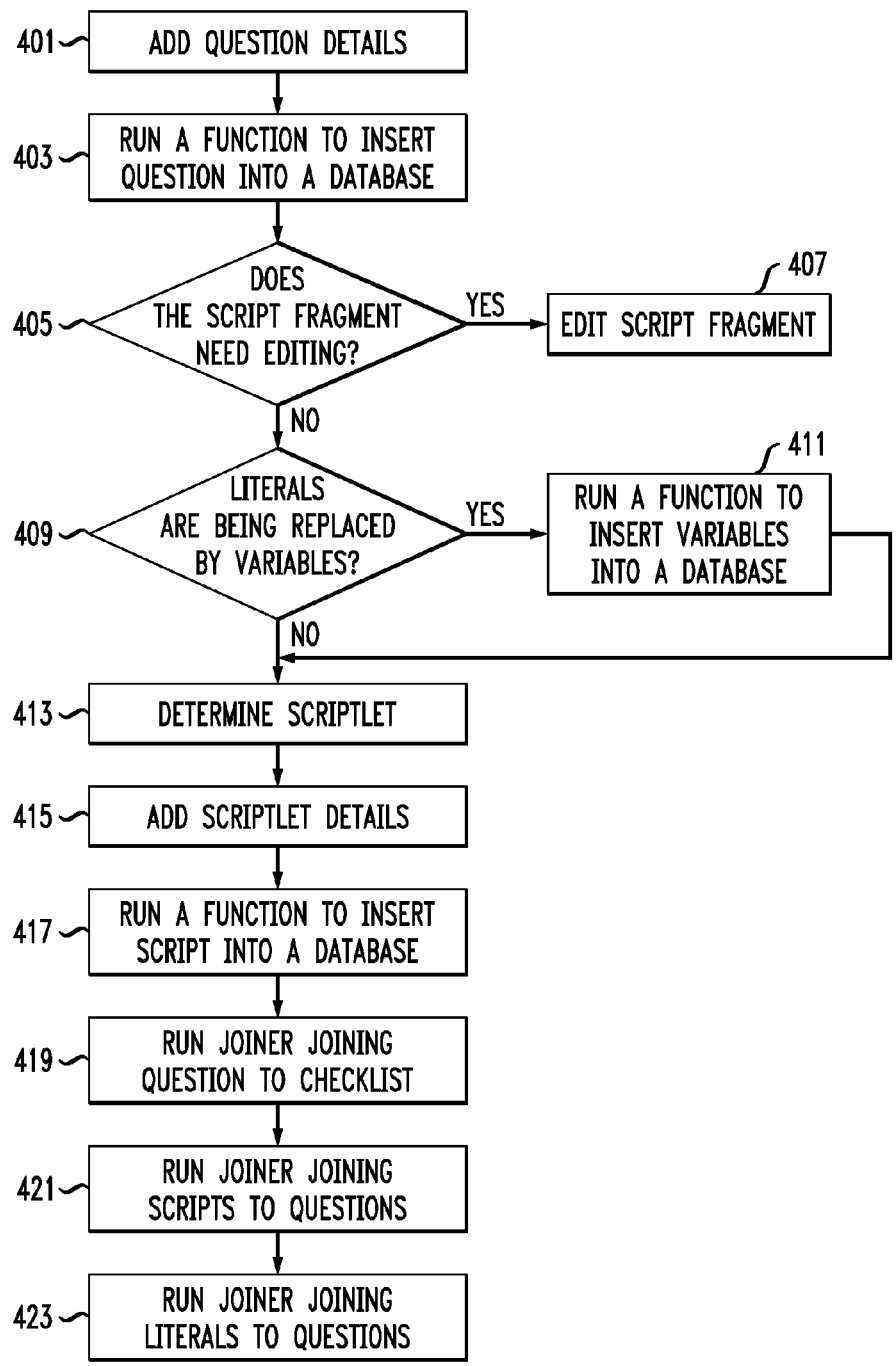
FIG. 4 is a flowchart diagram illustrating administrative steps to populate a library of reusable script fragments, according to an exemplary embodiment of the present invention.

FIG. 4 illustrates a flow diagram for a method of populating a library of script fragments, according to an exemplary embodiment of the present invention. In accordance with an embodiment of the present invention, questions, scripts, literals, and the joins of these items are performed via, for example, a web user interface (UI) to create, update, and delete these items, and to gather object details such as names, script file paths, values, etc. Alternatively, in a batch load option, questions, scripts, literals, and the joins of these items are performed by running programs, for example, JAVA® programs, that read comma separated values (CSV) files to gather object details such as names, script file paths, values, etc. Questions are joined to checklists, scripts are joined to questions, and literals are joined to questions. Variables can refer to values that are not known until runtime, and are associated with specific questions, while literals can refer to constants having a pre-defined fixed value that are associated with specific questions. The join of scripts to questions specifies a relative order of execution of the scripts, in a step column.

The method 400 includes adding question details 401, running a function (e.g., PutQuestion) to insert the question into a database 403, and evaluating a script fragment to determine whether the script fragment needs editing 405. If yes, the method proceeds to block 407, where the script fragment is edited. For example, if literals should be replaced by variables, this is performed, and literal details are written to the database. Literals can be replaced with variables, and variables can be populated with values read from the database at the time of script assembly.

If no at block 405, a query is made at block 409 whether literals are being replaced by variables? If yes, at block 411, a function (e.g., PutLiteral) is run to insert the variables into the database. If no at block 409, the method proceeds to block 413 where a scriptlet step is determined, and to block 415 where scriptlet details are added to the database. At block 417, a function (e.g., PutScript) is run to insert the script into the database. At blocks 419, 421 and 423, joiners are run to join questions to checklists, scripts to questions, and literals to questions.

FIG. 4 describes a process of developing or customizing scriptlets and loading them into a repository. When doing this it may be necessary to declare literals, to declare variables, to add the scriptlet itself to the inventory, and to describe when the scriptlet should be invoked, and under what circumstances. According to an embodiment, population of the database elements, which will drive the script assembly, is performed during the administrative and preparatory phases. During the operational phase, the database may also be used to retain information regarding a validation attempt. Such information might include history information such as timestamps, target server ids, and completion status.

Figure 5:
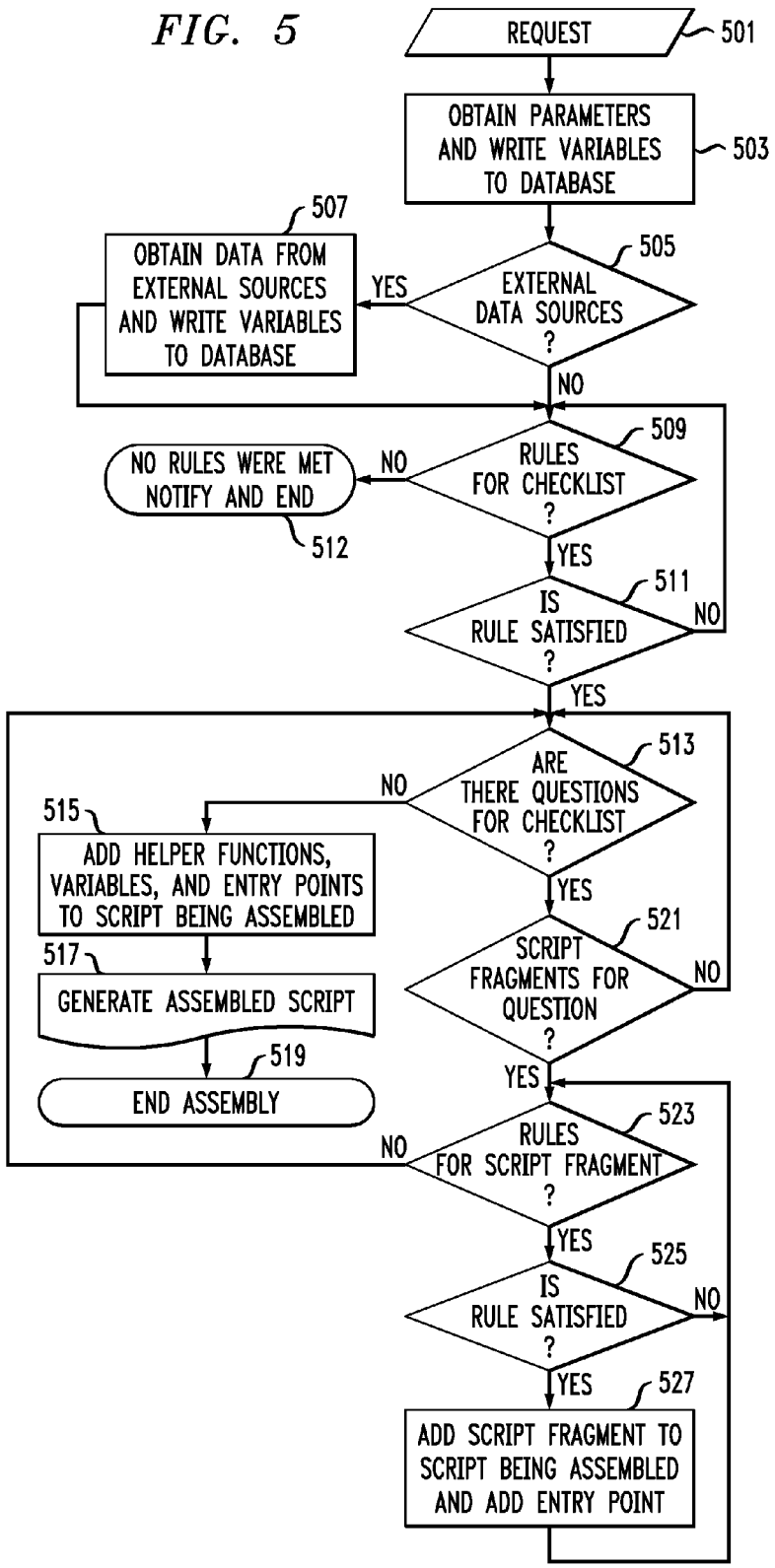
FIG. 5 illustrates a flow diagram for assembly of a script, according to an exemplary embodiment of the present invention.

FIG. 5 illustrates a flow diagram for assembly of a script, according to an exemplary embodiment of the present invention. In general, a validation request is accepted as input, appropriate target servers are identified, external sources are interrogated for additional required information, if any, and script assembly is performed as appropriate to the target server operating system (OS). The assembled script is pushed to the target server, invoked, and its outputs are retrieved, and reported.

The method 500 includes receiving a validation request 501, for example, a user request, and obtaining parameters for the script and writing variables to a database 503. For example, script parameters and values are written to a variables table in the database. Script parameters can include, for example, customer account id, geography (e.g., from the request) and middleware installed on a target.

At block 505, it is queried whether at least some of the script parameters are to be obtained from external data sources. If yes, at block 507, the data from external sources is obtained and variables based on the data from the external sources are written to a database (e.g., written to variables table). Variables can be scoped globally, to a checklist, and to a request. In addition, variables can be defined per the target OS scripting language.

If no at block 505, the method proceeds to block 509, where it is queried whether there are any checklist rules that correspond to one or more variables for the request. For example, a checklist is selected for the validation attempt that is appropriate to the target server's customer, account, geography, middleware and/or software. If there is no hit at block 509, then a given checklist is removed from the candidate list, and the process moves to the next checklist to see if any rules for that checklist correspond to variables of the request. If a rule is found at block 509, then it is queried at block 511 whether the checklist rule that corresponds to a variable for the request is satisfied. If the rule is not satisfied at block 511, the method returns to block 509 to look for additional checklist rules that correspond to one or more variables for the request. If no rules are satisfied at block 511, and no more checklist rules correspond to variables for the request, the method proceeds to block 512, where it is determined that no rules were met, a user is notified of this result, and the process ends.

If a rule is satisfied at block 511, a checklist is selected, and the method proceeds to block 513. For example, in a non-limiting illustrative embodiment, A, B are exemplar queries for checklist 1. A) 1:name='Account' and value='IGA'; B) 1:name='Geography' and value='NA'. If both A and B are met at block 511, then select Checklist 1, and proceed to block 513.

At block 513, it is queried whether there are outstanding checklist questions that must be addressed, in other words, has the checklist been completed? If no outstanding checklist questions (i.e., the checklist has been completed), then the method proceeds to blocks 515, 517 and 519, where helper functions, variables and entry points are appended to an output script, the assembled script is generated, and the assembly process ends. Non-helper functions can also be appended to an output script, with a list of the non-helper function names being added to an array and appended to the output script. Trailer helper functions, which perform post-processing functions such as, for example, clean-up of temporary files on a target, can also be appended to an output script.

If it is determined that there are questions for a checklist (i.e., the checklist has not been completed) at block 513, then the method proceeds to blocks 521, 523 and 525, where it is determined whether and what script fragments are needed based on responses to questions in the checklist. For example, the checklist may inquire as to the nature of the target OS, and if the target OS is a Linux® variant, a UNIX® script can be assembled out of variables and script fragments determined by responses to additional checklist questions. If the target OS is a Windows® variant, a Windows® script can be assembled out of variables and script fragments determined by responses to additional checklist questions.

Referring to block 521, it is determined whether any script fragments correspond to the questions for the checklist, and if so, at block 523 whether there are any rules for those script fragments. If so, it is determined at block 525 whether those rules are satisfied, and, if a rule is satisfied, the corresponding script fragment is added to an output script and an entry point is added to a list. The list refers to a list of script fragments (e.g., functions) to be executed.

If it is determined at block 521 that no script fragments correspond to a question for the checklist, the method returns to block 513 to check if there are more questions. If it is determined at block 523 that there are no rules for a script fragment from block 521, the method returns to block 521 to check if there are more script fragments. If it is determined at block 525 that a rule for a script fragment is not satisfied, the method returns to block 523 to check whether there are more rules. If it is determined at block 525 that a rule for a script fragment is satisfied, the method proceeds to block 527, where the script fragment for which the rule is satisfied is added to the script being assembled and an entry point is added to the list.

The questions, variables, and script fragments associated with a checklist are retrieved by means of querying the database join tables and assembling the results (with appropriate scripting syntax) into an output script.

FIG. 6 illustrates a process flow performed after script assembly, according to an exemplary embodiment of the present invention. Referring to FIG. 6, a method 600 includes pushing an assembled script and helper files, if any to the target server 601, invoking the script 603, retrieving the script outputs 605, and reporting and storing the results of the script outputs 607.

FIG. 7 illustrates a script fragment 700, according to an exemplary embodiment of the present invention. FIG. 8 illustrates a portion of a validation report 800 according to an exemplary embodiment of the present invention. As can be seen in FIG. 8, the report includes information on whether certain elements of a target platform meet requirements of a source environment. In accordance with an embodiment, the elements may correspond to identifiers, authentication, directories, confidentiality and permissions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
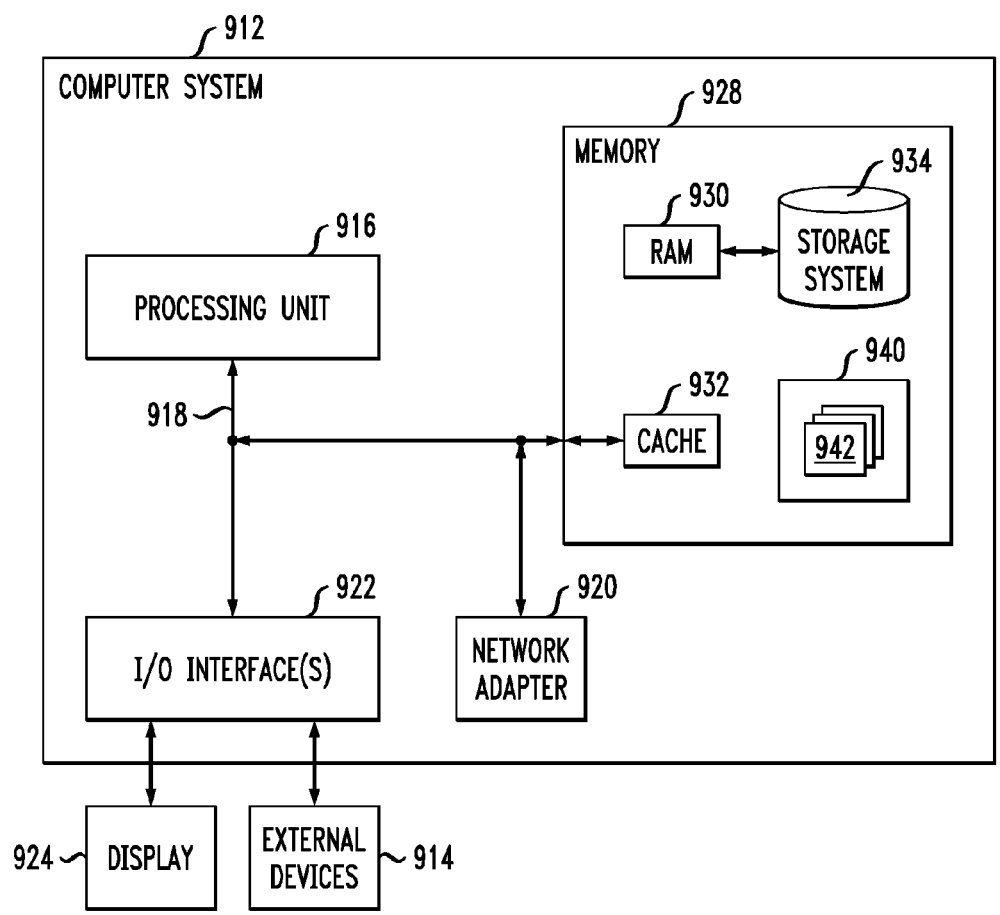
FIG. 9 illustrates a computer system that may be used to implement one or more components/steps of the techniques of the invention, according to an exemplary embodiment of the invention.

One or more embodiments can make use of software running on a general-purpose computer or workstation. With reference to FIG. 9, in a computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

The bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 912 typically includes a variety of computer system readable media. Such media may be any available media that is accessible by computer system/server 912, and it includes both volatile and non-volatile media, removable and non-removable media.

The system memory 928 can include computer system readable media in the form of volatile memory, such as random access memory (RAM) 930 and/or cache memory 932. The computer system/server 912 may further include other removable/non-removable, volatile/nonvolatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 918 by one or more data media interfaces. As depicted and described herein, the memory 928 may include at least one program product having a set (e.g., at least one) of program modules that are configured to carry out the functions of embodiments of the invention. A program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc., one or more devices that enable a user to interact with computer system/server 912, and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for validation of a target environment, comprising:
  assembling a validation script from a plurality of script fragments, wherein a script fragment is a component of the validation script that links a data variable of a plurality of data variables with a definition of the data variable and places a result of the linking in a script variable;
  inserting the assembled validation script into the target environment;
  executing the validation script in the target environment;
  gathering results of the executing; and
  reporting the results to at least one user;
  wherein assembling the validation script comprises:
    determining a characteristic of the target environment corresponding to the definition;
    determining that a given script fragment corresponds to the characteristic of the target environment;
    obtaining parameters for the validation script and writing the plurality of data variables to a database;
    querying whether any checklist rules correspond to one or more of the data variables;
    querying, when a checklist rule corresponds to one or more of the data variables, whether the checklist rule has been satisfied;
    selecting a checklist having the satisfied checklist rule;
    querying whether the selected checklist has been completed; and
    appending at least one of a functional component and a data component to the validation script upon determining that the selected checklist has been completed; and
  wherein the assembling, inserting, executing, gathering and reporting steps are performed by a computer system comprising a memory and at least one processor coupled to the memory.

2. The method according to claim 1, further comprising: invoking an external source to supply the characteristic of the target environment.

3. The method according to claim 1, further comprising: determining that the script fragments correspond to requirements of a customer.

4. The method according to claim 1, further comprising: creating and storing the plurality of script fragments, wherein the script fragments are re-usable.

5. The method according to claim 1, further comprising:
  declaring the plurality of data variables in the script fragments; and
  populating the data variables with values obtained from an external source;
  wherein the populating comprises dynamically invoking an external agency to supply the values that are locally unavailable.

6. The method according to claim 1, further comprising:
codifying a plurality of customer requirements as a set of questions; and
using one or more of the script fragments to answer the set of the questions.

7. The method according to claim 1, further comprising:
scoping at least a first one of the data variables globally, at least a second one of the data variables to a checklist and at least a third one of the data variables to a request.

8. A system for validation of a target environment, comprising:
a memory and at least one processor operatively coupled to the memory;
a validation module, executed via the at least one processor, and capable of assembling a validation script from a plurality of script fragments, and inserting the assembled validation script into the target environment, wherein a script fragment is a component of the validation script that links a data variable of a plurality of data variables with a definition of the data variable and places a result of the linking in a script variable;
a target module operatively coupled to the validation module and executed via the at least one processor, and capable of executing the validation script in the target environment;
wherein the validation module is further capable of gathering results of the executing; and
a reporting module operatively coupled to the validation module and executed via the at least one processor, and capable of reporting the results to at least one user;
wherein assembling the validation script comprises:
determining a characteristic of the target environment corresponding to the definition;
determining that a given script fragment corresponds to the characteristic of the target environment;
obtaining parameters for the validation script and writing the plurality of data variables to a database;
querying whether any checklist rules correspond to one or more of the data variables;
querying, when a checklist rule corresponds to one or more of the data variables, whether the checklist rule has been satisfied;
selecting a checklist having the satisfied checklist rule;
querying whether the selected checklist has been completed; and
appending at least one of a functional component and a data component to the validation script upon determining that the selected checklist has been completed.

9. The system according to claim 8, wherein the validation module is further capable of invoking an external source to supply the characteristic of the target environment.

10. The system according to claim 8, further comprising a preparatory module capable of creating and storing the plurality of script fragments, wherein the script fragments are re-usable.

11. The system according to claim 8, wherein the validation module is further capable of:
declaring the plurality of data variables in the script fragments; and
populating the data variables with values obtained from an external source;
wherein the populating comprises dynamically invoking an external agency to supply the values that are locally unavailable.

12. The system according to claim 8, wherein the validation module is further capable of:
codifying a plurality of customer requirements as a set of questions; and
using one or more of the script fragments to answer the set of the questions.

13. The system according to claim 8, wherein the validation module is further capable of:
scoping at least a first one of the data variables globally, at least a second one of the data variables to a checklist and at least a third one of the data variables to a request.

14. A computer program product for server validation, the computer program product comprising a computer readable storage medium having program instructions embodied therewith, the program instructions executable by a processor to cause the processor to perform a method comprising:
assembling a validation script from a plurality of script fragments, wherein a script fragment is a component of the validation script that links a data variable of a plurality of data variables with a definition of the data variable and places a result of the linking in a script variable;
inserting the assembled validation script into the target environment;
executing the validation script in the target environment;
gathering results of the executing; and
reporting the results to at least one user;
wherein assembling the validation script comprises:
determining a characteristic of the target environment corresponding to the definition;
determining that a given script fragment corresponds to the characteristic of the target environment;
obtaining parameters for the validation script and writing the plurality of data variables to a database;
querying whether any checklist rules correspond to one or more of the data variables;
querying, when a checklist rule corresponds to one or more of the data variables, whether the checklist rule has been satisfied;
selecting a checklist having the satisfied checklist rule;
querying whether the selected checklist has been completed; and
appending at least one of a functional component and a data component to the validation script upon determining that the selected checklist has been completed.

15. The method according to claim 1, wherein assembling the validation script further comprises:
retrieving the given script fragment; and
incorporating the given script fragment into the validation script using a scripting syntax.

16. The system according to claim 8, wherein assembling the validation script further comprises:
retrieving the given script fragment; and
incorporating the given script fragment into the validation script using a scripting syntax.

* * * * *